United States Patent [19]

McKendree et al.

[11] Patent Number: 4,620,445

[45] Date of Patent: Nov. 4, 1986

[54] PORTABLE ACOUSTIC INTENSITY MEASURING DEVICE

[75] Inventors: Francis S. McKendree, Wilkinsburg; John M. Zomp, North Huntingdon, both of Pa.

[73] Assignee: Westinghouse Electric Corp., Pittsburgh, Pa.

[21] Appl. No.: 663,010

[22] Filed: Oct. 19, 1984

[51] Int. Cl.[4] .............................................. G01H 3/12
[52] U.S. Cl. .................................................... 73/647
[58] Field of Search ............................ 73/646, 647, 648

[56] References Cited

U.S. PATENT DOCUMENTS

| | | | |
|---|---|---|---|
| 1,829,644 | 5/1931 | Olson . | |
| 2,836,656 | 5/1958 | Schultz | 73/647 |
| 3,658,147 | 4/1972 | Ho et al. | 73/647 |
| 3,968,697 | 7/1976 | Mutziger | 73/647 |

OTHER PUBLICATIONS

F. H. Fahy, "Measurement of Acoustic Intensity Using the Cross-Spectral Density of Two Microphone Signals", *Journal of Acoustical Society of America*, vol. 62, pp. 1057–1059, 1977.

*Primary Examiner*—Stewart J. Levy
*Assistant Examiner*—John E. Chapman, Jr.
*Attorney, Agent, or Firm*—R. S. Lombard

[57] ABSTRACT

A portable acoustic intensity measuring device comprising a pair of electroacoustic transducers at a positioned predetermined distance from one another. The measuring device utilizes analog summing, subtraction, integration and multiplier means for measuring an acoustic intensity vector midway between the two electroacoustic transducers. The acoustic intensity measuring device further comprises error correction means connected in circuit with a preamplifier means and a meter means. The error correction means includes switching means comprising a first switch connected in circuit with the preamplifier and summing means and subtraction means and a second switch connected in circuit with the multiplier and the meter for simultaneously switching the first and second preamplified analog signals at the summing input and subtraction input and for simultaneously switching the polarity of the acoustic intensity signal at the meter. The error correction means eliminates any errors induced by phase mismatch and/or any inherent DC component of the device.

2 Claims, 6 Drawing Figures

PORTABLE ACOUSTIC INTENSITY MEASURING DEVICE

BACKGROUND OF THE INVENTION

The present invention relates to devices for measuring sound power and, more particularly, to an acoustic intensity measuring device which measures the vector product of sound pressure and particle velocity in an acoustic wave. There has been increasing interest in the recent years in acoustic intensity measurements. Part of this is due to the increased awareness of noise as a hazard in the work place. Devices capable of measuring acoustic intensity provide a means for determining the sound power contribution of a particular source by integrating the acoustic intensity vector over an imaginary surface surrounding the source. U.S. Pat. No. 1,892,644 issued to Harry F. Olson on Dec. 27, 1932 disclosed one of the first systems and apparatus for measuring the energy flow of a sound wave. The Olson apparatus utilized one microphone for measuring sound pressure and a velocity responsive microphone for measuring the average velocity of a sound wave past a point. However, the early measurement attempts such as Olson required complex, specialized instrumentation and were generally only partially successful. More recently, as disclosed in an article entitled "Measurement of Acoustic Intensity Using the Cross-Spectral Density of Two Microphone Signals" by F. J. Fahy, in the *Journal of Acoustical Society of America*, Vol. 62, pp. 1057-1059, 1977, a significant improvement was shown in intensity measurement with phase development of an intensity formulation in terms of cross-spectral densities. The Fahy method of measurement permits the use of a two-microphone technique. The two microphones or electroacoustic transducers each converts sound pressure into an electrical signal. The microphones are separated by a predetermined distance and the electrical signals are processed to measure the acoustic intensity vector along the line joining them. Letting the microphone signals be $P_A$ and $P_B$, the average pressure is $$P = \tfrac{1}{2}(P_A + P_B)$$

and the particle velocity is $$u = (1/pd)(P_B - P_A)\, dt$$

at the midpoint between the microphones, where p is the density of the fluid and d is the microphone separation. By definition, the acoustic intensity vector is $$I = p \cdot u$$

Measurement devices such as the sound intensity analyzing system manufactured by Bruel and Kgaer Type 3360, Sound Intensity Analyzing System, employ the two-microphone cross-spectral acoustic intensity measurement method. Devices such as the Bruel and Kgaer Type 3360 Sound Intensity Analyzing System process the electrical signals from the microphones utilizing digital components. Such devices are not readily portable and are quite expensive.

The acoustic intensity measuring device of the present invention is portable, lightweight and inexpensive and it is readily adaptable for use in the field such as a factory or hospital for measuring acoustic intensity wherever desired.

SUMMARY OF THE INVENTION

There is provided a portable acoustic intensity measuring device comprising electric acoustic transducer means. The electroacoustic transducer means comprises a pair of electroacoustic transducers or microphones positioned at a predetermined distance from one another. The first of the electroacoustic transducers produces a first electrical analog signal representative of the sound pressure at the first electroacoustic transducer. A second of the electroacoustic transducers produces a second electrical analog signal representative of the sound pressure at the second electroacoustic transducer.

The device further comprises preamplifier means connected in circuit with the electroacoustic transducer means for amplifying the first and second electrical analog signals by a predetermined gain. The preamplifier means has an output and produces first and second preamplified sound pressure analog signals at the preamplifier means output. Analog summing means are provided connected in circuit with the preamplifier output means. The summing means comprises a first input and second input for receiving the first and second preamplified sound pressure analog signals. The summing means has an output and produces at the output a summing analog output signal representative of the average of the sum of the first and second preamplified sound pressure analog signals.

The device further comprises analog subtraction means connected in circuit with the preamplifier output means. The analog subtraction means comprises first and second inputs for receiving the first and second preamplified sound pressure analog signals. The analog subtraction means has an output and produces at the subtraction output a difference analog output signal representative of the difference of the first and second preamplified sound pressure analog signals. Analog integrator means is provided having an input connected in circuit with the subtraction output. The analog integrator has an output and produces at the analog integrator output an integrated analog signal representative of the particle velocity midway between the electroacoustic transducers. An analog multiplier is provided having first and second inputs, the first of which is connected in circuit with the summing output and the second of which is connected in circuit with the integrator output. The analog multiplier has an output and multiplies the summed output signal together with the integrated output signal and produces an acoustic intensity signal at the multiplier output representative of an acoustic intensity velocity vector midway between the electroacoustic transducers.

The device also includes meter means connected in circuit with the multiplier output for receiving the acoustic intensity signal. The meter means includes visual display means responsive to the acoustic intensity signal for visually indicating the acoustic intensity vector. Power supply means is provided for supplying power for the acoustic intensity device.

The device preferably comprises housing means of predetermined size and shape for housing the acoustic intensity measuring device.

In another embodiment, the acoustic intensity measuring device further comprises error correction means connected in circuit with the preamplifier means and the meter means. The error correction means includes switching means comprising a first switch connected in circuit with the preamplifier and summing means and subtraction means and a second switch connected in circuit with the multiplier and the meter for simultaneously switching the first and second preamplified analog signals at the summing input and subtraction input and for simultaneously switching the polarity of the acoustic intensity signal at the meter. The error correction means eliminates any errors induced by phase mismatch and/or any inherent DC component of the device. Preferably, the error correction means further comprises an oscillator in circuit with the first and second switching means.

In another embodiment, the device further comprises A-weighting means connected in circuit with the preamplifier for adjusting predetermined portions of the first and second preamplified sound pressure analog signals to produce first and second A-weighted adjusted sound pressure analog signals. The A-weighting means includes an output and produces first and second A-weighted adjusted sound pressure analog signals at the A-weighting means output. Preferably the A-weighting means is connected in circuit between the preamplifier means and the summing means and subtraction means.

BRIEF DESCRIPTION OF THE DRAWINGS

For a better understanding of the invention, reference may be had to the preferred embodiments as disclosed in the accompanying drawings, in which.

DESCRIPTION OF THE PREFERRED EMBODIMENT

Figure 1:
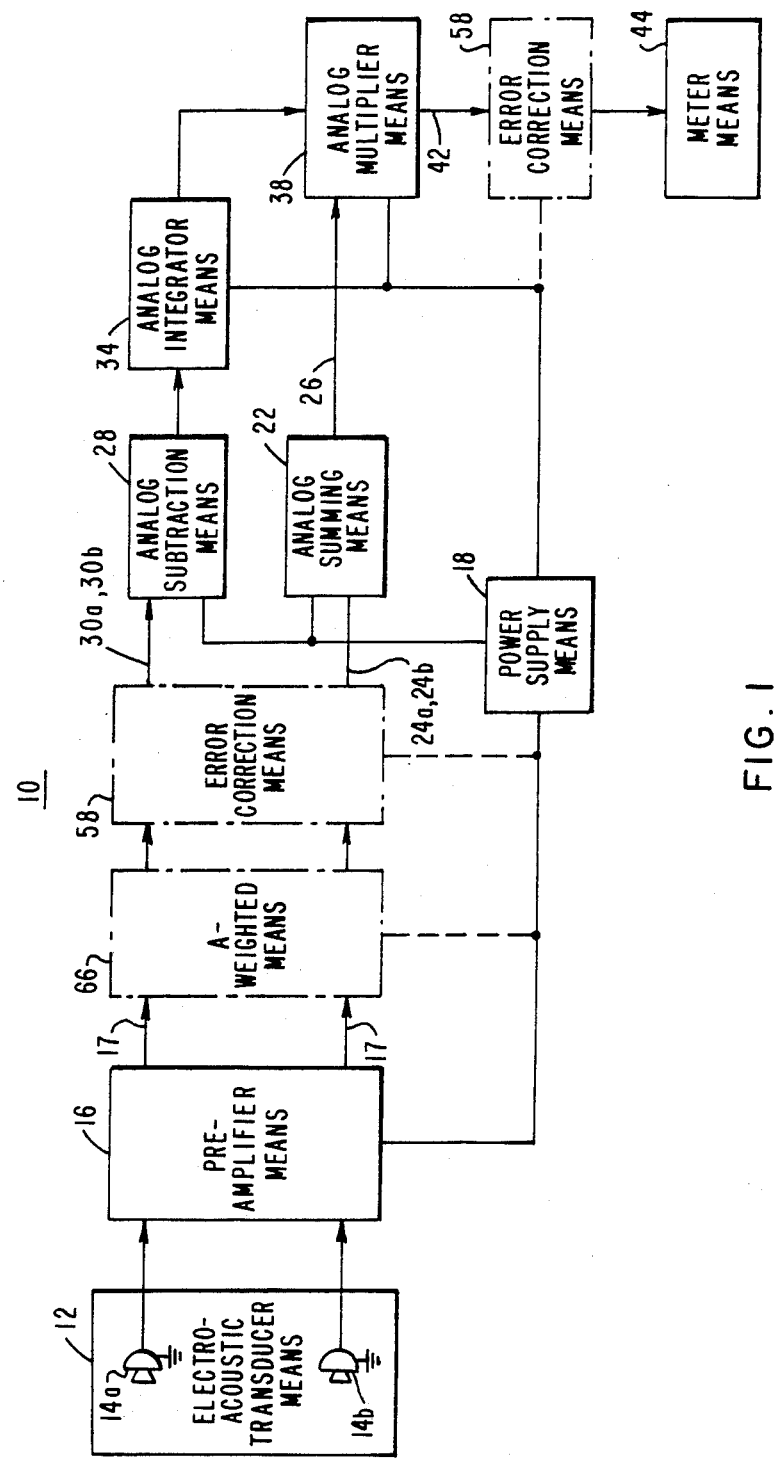
FIG. 1 is a block diagram of the preferred circuit of the various embodiments.
Figure 2A:
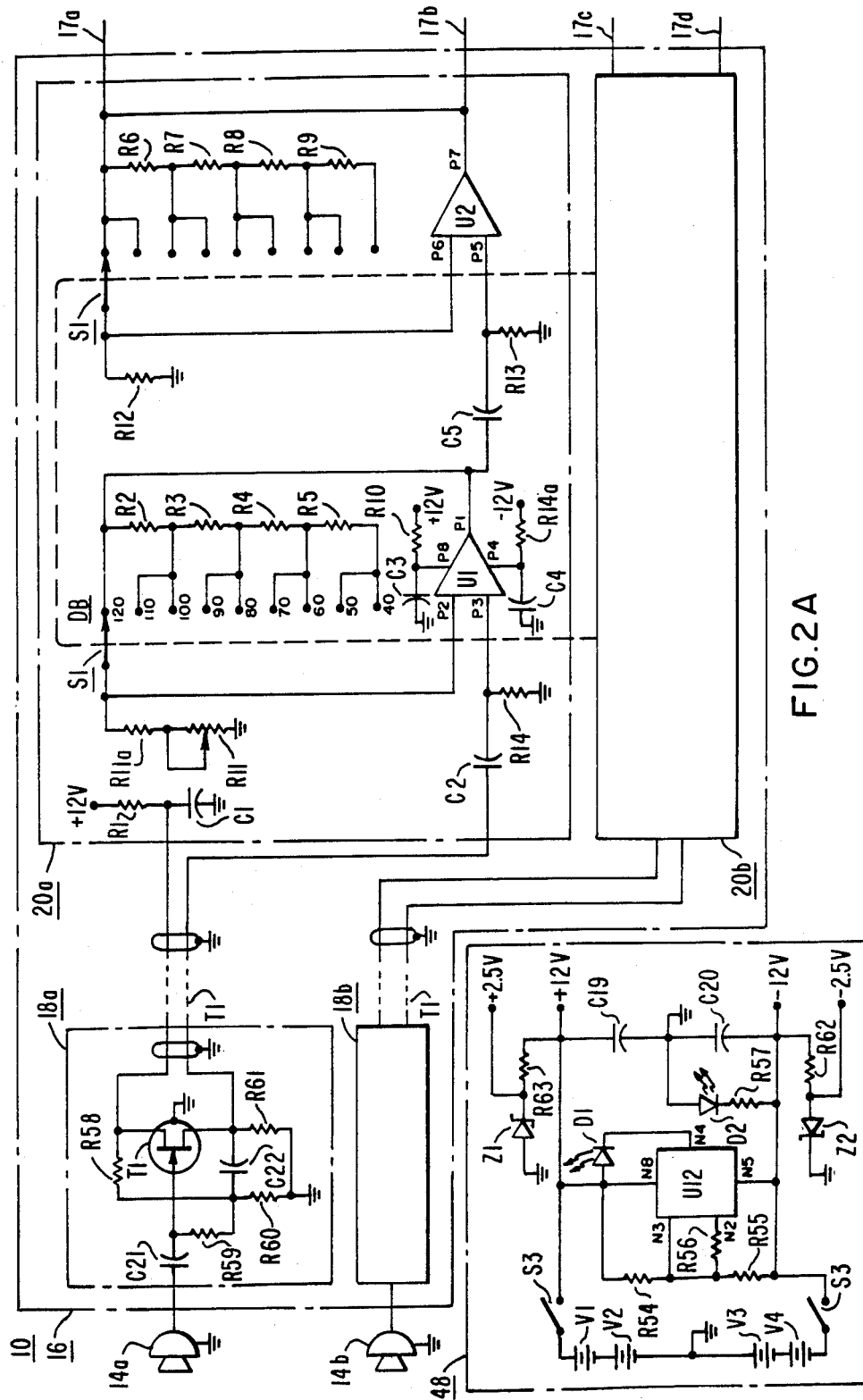
FIGS. 2A, 2B, and 2C are schematic diagrams of a preferred circuit in accordance with the present invention.
Figure 4:
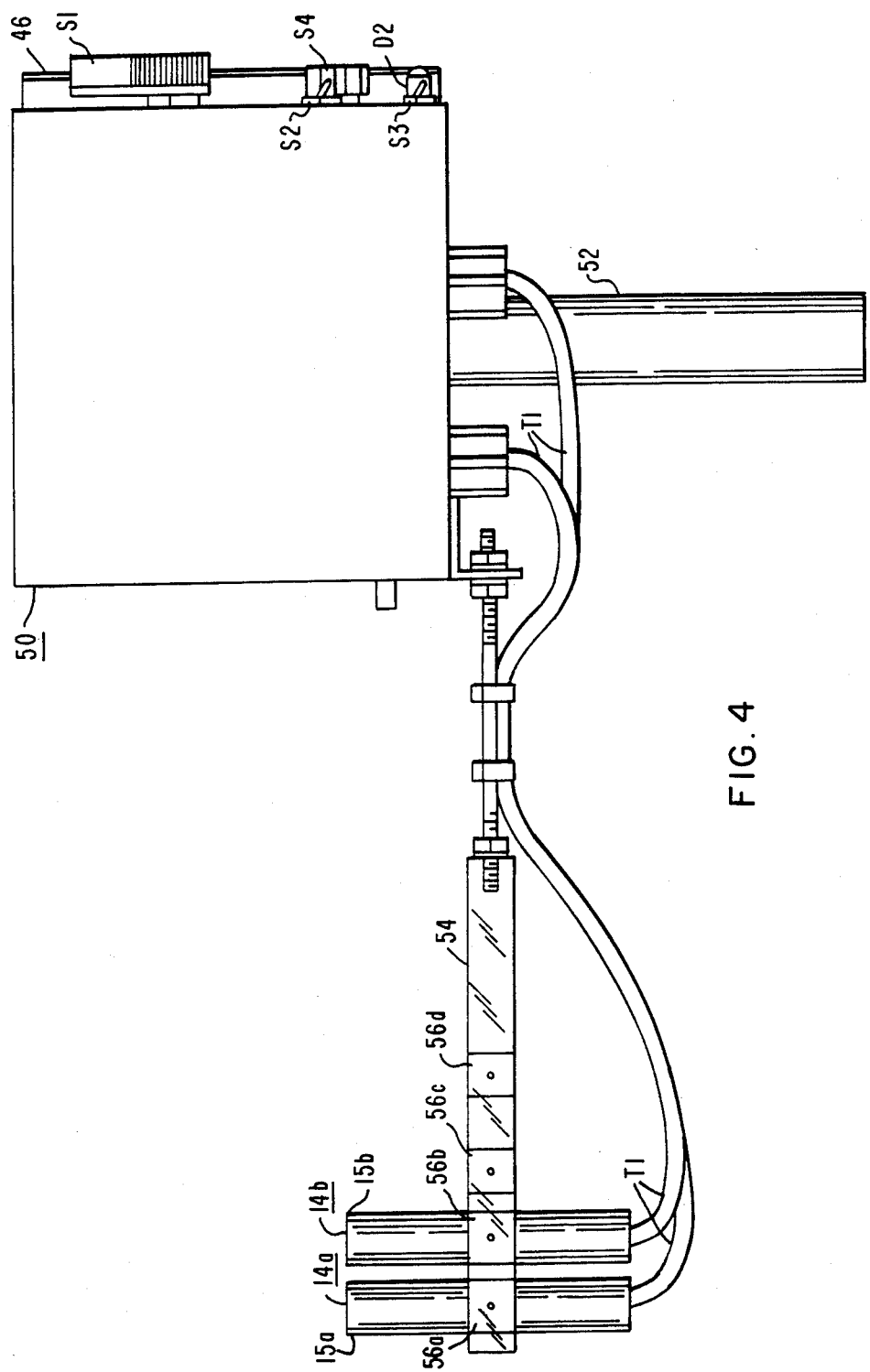
FIG. 4 is a side elevational view of the acoustic intensity measuring device of the present invention.

Referring to FIGS. 1, 2A, 2B, and 2C there is provided a portable acoustic intensity measuring device 10. The portable measuring device 10 comprises electroacoustic transducer means 12 comprising a pair of electroacoustic transducers 14a, 14b which preferably are microphones such as model no. 4176 manufactured by Bruel & Kjaer. The electroacoustic transducers 14a, 14b are positioned a predetermined distance from one another such as ¾ inch. The electroacoustic transducer 14a, 14b are also preferably positioned in predetermined spaced relationship such as shown in FIG. 4 where they are positioned with their axes parallel to one another with their sound receiving ends 15a, 15b terminating in the same plane. The first of the electroacoustic transducers 14a produces a first electrical analog signal representative of the sound pressure at the first electroacoustic transducer 14a. The second of the electroacoustic transducers 14b produces a second electrical analog signal representative of the sound pressure at the second electroacoustic transducer. Preamplifier means 16 is connected in circuit with the electroacoustic transducer means 12 for amplifying the first and second electrical analog signals by a predetermined gain, such as 1000 for a full-scale intensity level of 70 dB. As shown in FIG. 2A preamplifier means 16 preferably comprises a first-stage preamplifier 18a, 18b for electroacoustic transducer 14a, 14b, respectively, as shown in FIG. 2A. The first-stage preamplifier 18b is identical to the first-stage preamplifier 18a in FIG. 2A and the schematic diagram therefore is the same as that for 18a and is not shown. First-stage preamplifiers 18a and 18b are preferably housed within the corresponding electroacoustic transducer 14a, 14b. The first-stage preamplifier 18a, 18b acts as an impedance transformation device which transforms the input impedance which is in the area of 10,000 megohms to an output impedance of less than 100 ohms. The preamplifier means 16 preferably includes second-stage preamplifiers 20a, 20b connected in circuit as shown in FIG. 2A. The schematic diagram of the second stage preamplifier 20b is identical to that of the second-stage preamplifier 20a and is therefore not shown in FIG. 2A.

Figure 2B:
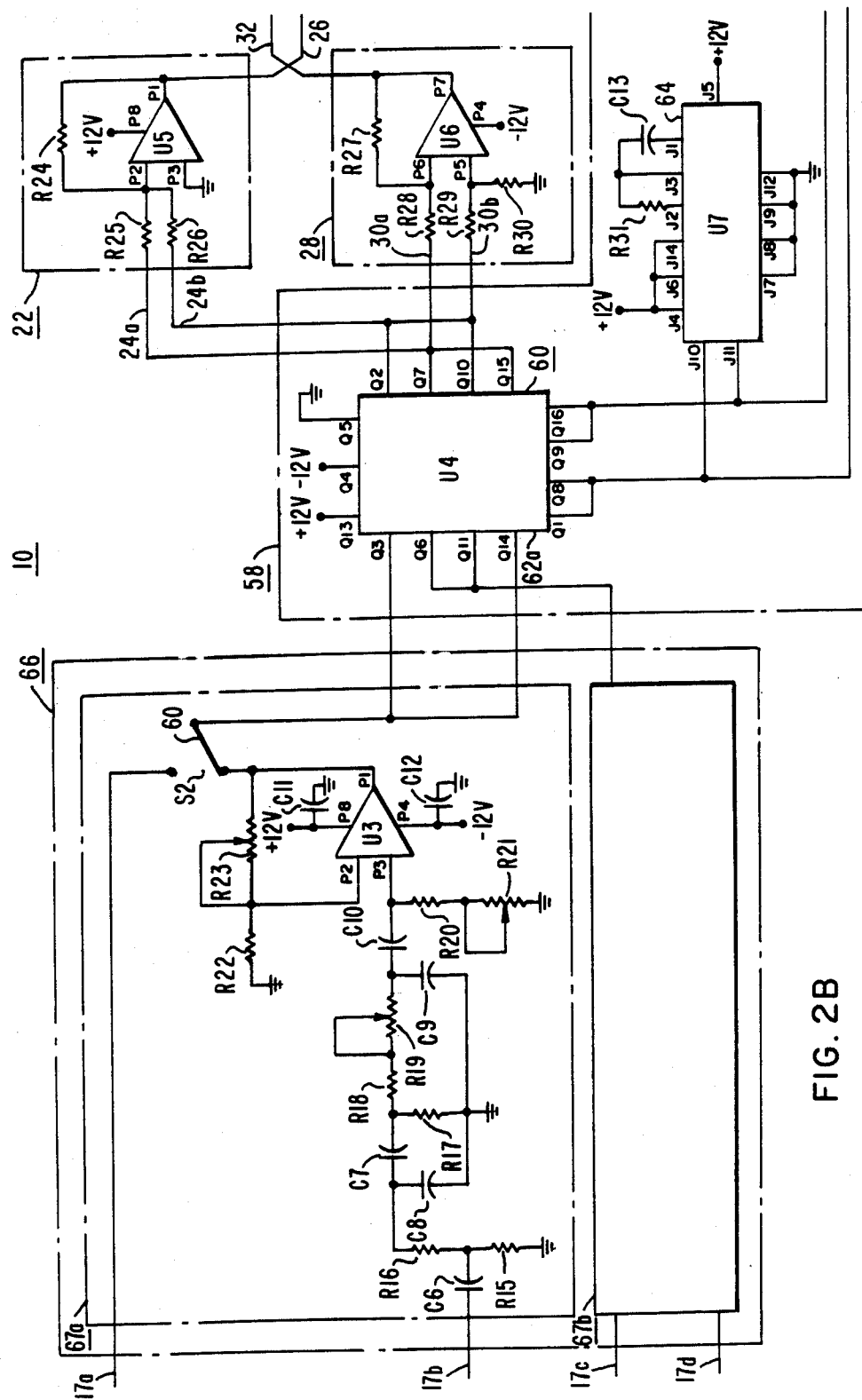

As shown in FIG. 2B, analog summing means 22 is connected in circuit with the preamplifier output means 17. The summing means 22 comprises first and second input means 24a, 24b. The summing means has output means 26. The summing means 22 produces at the summing output 26 a summed analog output signal representative of the average of the sum of the first and second preamplified sound pressure analog signals. Analog subtraction means 28 is connected in circuit with the preamplifier output means 17. The analog subtraction means comprises first and second input means 30a, 30b for receiving said first and second preamplified sound pressure analog signals. The analog subtraction means 28 has output means 32. The analog substraction means 28 produces at the subtraction means output 32 a difference analog output signal representative of the difference of the first and second preamplified sound pressure analog signals.

Analog integrator means 34 is connected in circuit with the subtraction output means 32. The analog integrator means 34 has output means 36. The analog integrator means 34 produces at the analog integrator output means 36 an integrated analog signal representative of the particle velocity midway between the electroacoustic transducers 14a, 14b.

Figure 2C:
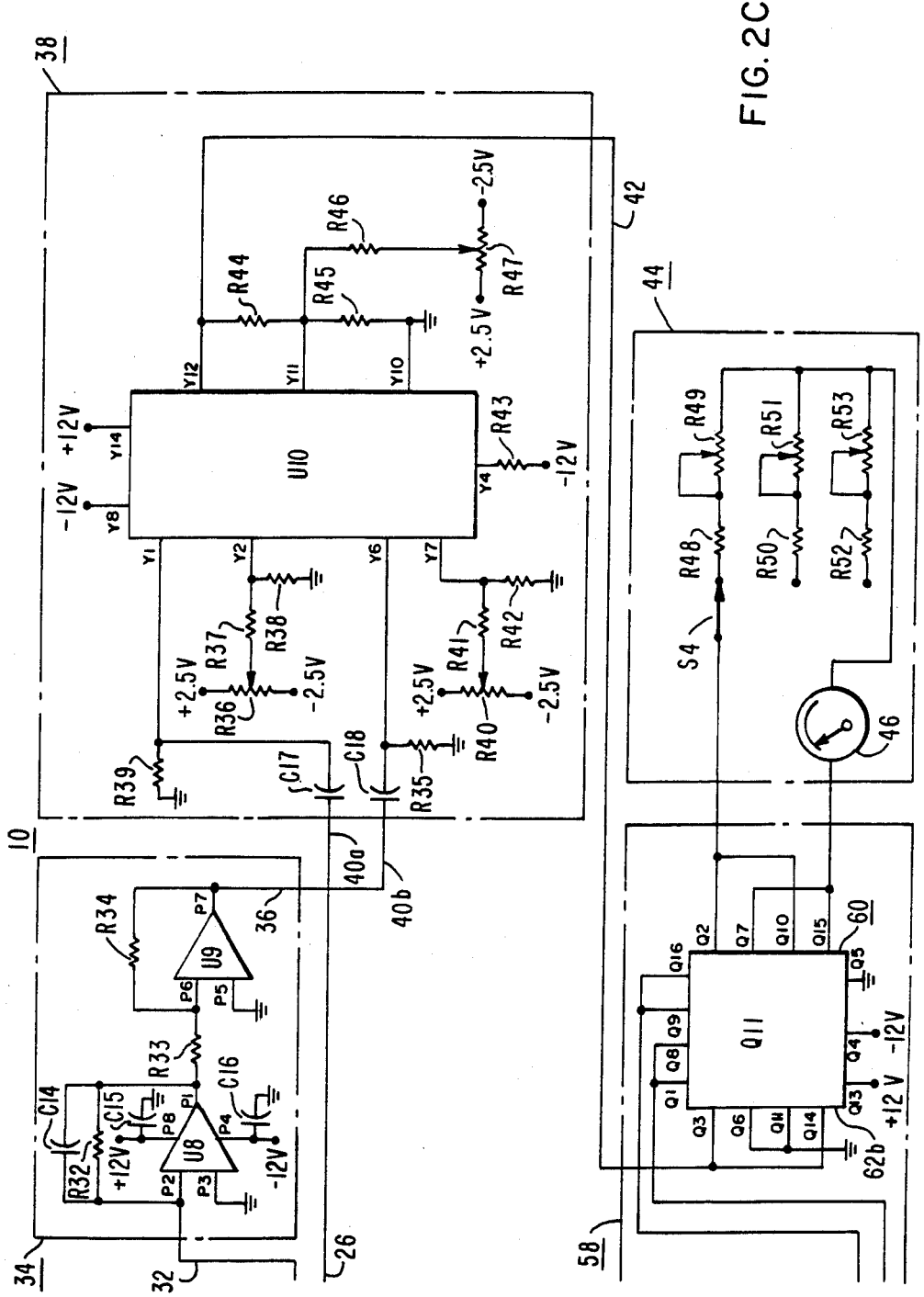

Referring to FIG. 2C, analog multiplier means 38 has first and second input means 40a, 40b. The first multiplier input means 40a is connected in circuit with the summing output means 26. The second multiplier input means 40b is connected in circuit with the integrator output means 36. The analog multiplier means has output means 42. The analog multiplier 38 multiplies the summed output signal together with the integrated output signal and produces an acoustic intensity signal at the multiplier output 42 representative of an acoustic intensity velocity vector midway between the electroacoustic transducers 14a, 14b. The present device 10 measures acoustic intensity (the vector power flow) in dB relative to $10^{-12}$ watts per square meter.

Figure 3:
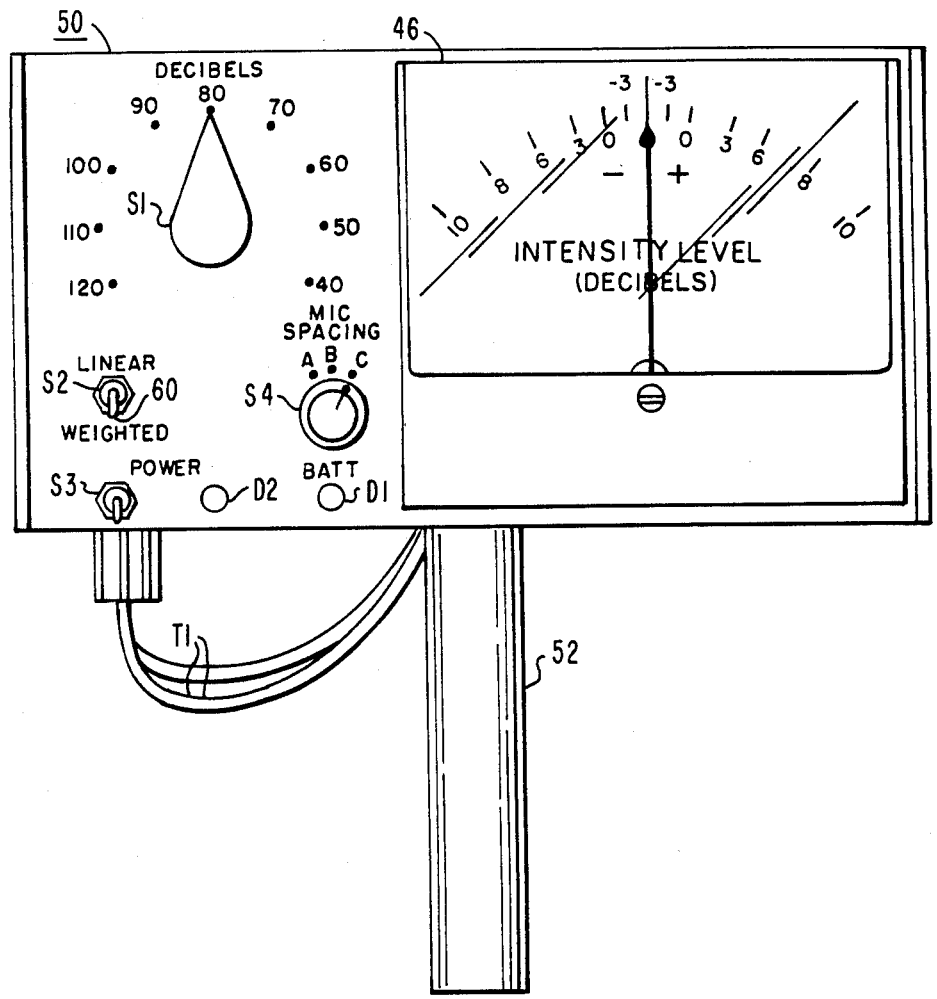
FIG. 3 is a front elevational view of the acoustic intensity measuring device of the present invention.

Meter means 44 is provided connected in circuit with the multiplier output 42 for receiving the acoustic intensity signal. With reference to FIG. 3 the meter means includes visual display means 46 responsive to the acoustic intensity signal for visually indicating the acoustic intensity vector. Power supply means 48 is provided for supplying power for the portable acoustic intensity measuring device 10. The power supply means 48 is preferably a relatively low power consumption supply as shown in FIG. 2A.

Preferably, the portable acoustic intensity measuring device 10 comprises housing and support means 50 of predetermined size and shape for supporting and housing the acoustic intensity measuring device 10 as shown in FIGS. 3 and 4. As shown in FIG. 3, the housing means 15 desirably includes a handle 52. The electroacoustic transducers 14a, 14b are supported by an arm 54. The arm 54 has passage means 56a, 56b, and 56c therethrough positioned at a predetermined distance from one another such as $\frac{3}{4}$, $1\frac{1}{2}$, or 3 inches for supporting the electrode acoustic transducers 14a, 14b. By moving the electroacoustic transducer 14b shown in FIG. 4 from passage 56b to 56c, the separation between the electroacoustic transducers is changed and thus the frequency response of the acoustic intensity measuring device may be varied. For example, in the $\frac{3}{4}$ inch spacing, that between 56a and 56b, the frequency response is one octave higher than 56c, and in the 3 inch spacing between 56a and 56d, the frequency response is one octave lower. The distance is varied depending upon the maximum frequency of interest and the degree of low-frequency noise suppression required.

Preferably, the portable acoustic intensity measuring device 10 comprises error correction means 58 connected in circuit with the preamplifier means 16 and the meter means 44. The error correction means includes switching means 60 comprising a first switching means 62a connected in circuit with the preamplifier means 16 and the summing means 22 and the subtraction means 28. The switching means 60 also comprises a second switching means 62b connected in circuit with the multiplier means 38 and the meter means 44 for simultaneously switching the first and second preamplified analog signals at said summing input means and said subtraction input means and for simultaneously switching the polarity of said acoustic intensity signal at the meter means 44. Preferably, the error correction means 58 comprises oscillator means 64 in circuit with the first and second switching means 62a, 62b. The error correction means also negates any undesirable DC component which may develop in the circuit of the device 10.

With reference to FIGS. 1 and 2B, the device 10 preferably includes A-weighting means 66 connected in circuit with the preamplifier means 16 for adjusting predetermined portions of the first and second preamplified sound pressure analog signals to produce first and second A-weighted adjusted sound pressure analog signals. The A-weighting means includes first and second A-weighting circuits 67a, 67b which are identical, one for each microphone 14a, 14b. Circuit 67b is not shown in FIG. 2B. The A-weighting means is provided with an output means. The A-weighting means produces first and second A-weighted adjusted analog sound pressure signals at the A-weighting output 68. As shown in FIG. 2B and FIG. 3, the A-weighting means 66 is provided with toggle switch 60 to permit switching between the linear or non-A-weighted mode and the A-weighted mode. The standard for A-weighting is given by American National Standards Institute S1.4, American National specification for sound level meters, AMSI-S1.4, 1971. The A-weighting curve is a frequency response that corresponds to the sensitivity of the human ear. The ear is less sensitive to low and high frequencies and more sensitive to mid-range frequencies. The A-weighted circuit thus adjusts the first and second preamplified analog sound pressure signals to correspond to the A-weighted curves. The circuit as shown in FIG. 2B for the A-weighting means 66 is known in the art. Preferably, the A-weighting means 66 is connected in circuit between the preamplifier means 16 and the summing means 26 and subtraction means 28 as shown in FIG. 2B.

The following table of components by way of example only specifies typical values for uses in the circuit shown in FIGS. 2A, 2B, 2C.

TABLE

| COMPONENT | VALUE | |
|---|---|---|
| C1 | 220 μf | Solid Tantalum (Sprague 196D) |
| C2 | 0.01 μf | Disc Ceramic |
| C3 | 220 μf | Solid Tantalum (Sprague 196D) |
| C4 | 220 μf | Solid Tantalum (Sprague 196D) |
| C5 | 0.01 μf | Disc Ceramic |
| C6 | 0.22 μf | Polycarbonate Film (Low Tempco) |
| C7 | 0.01 μf | Polycarbonate Film (Low Tempco) |
| C8 | 0.002 μf | Polycarbonate Film (Low Tempco) |
| C9 | 500 pf | Dipped Mica (Low Tempco) |
| C10 | 200 pf | Dipped Mica (Low Tempco) |
| C11 | 0.1 μf | Monolithic Ceramic |
| C12 | 0.1 μf | Monolithic Ceramic |
| C13 | 0.02 μf | Disc Ceramic |
| C14 | 0.033 μf | Polycarbonate Film (Low Tempco) |
| C15 | 0.1 μf | Monolithic Ceramic |
| C16 | 0.1 μf | Monolithic Ceramic |
| C17 | 1.0 μf | Monolithic Ceramic |
| C18 | 1.0 μf | Monolithic Ceramic |
| C19 | 10.0 μf | Solid Tantalum (Sprague 196D) |
| C20 | 10.0 μF | Solid Tantalum (Sprague 196D) |
| C21 | 0.01 μf | Monolithic Ceramic (Size Important) |
| C22 | 2.0 μf | Monolithic Ceramic (Size Important) |
| U1 | CA3240 | RCA |
| U2 | CA3240 | RCA |
| U3 | CA3240 | RCA |
| U4 | DG 201 | Siliconix Inc. |
| U5 | CA3240 | RCA |
| U6 | CA3240 | RCA |
| U7 | CD4047B | RCA |
| U8 | CA3240 | RCA |
| U9 | CA3240 | RCA |
| U10 | AD 534 | Analog Devices |
| U11 | DG 201 | Siliconix Inc. |
| U12 | 8211 | Intersil |
| T1 | CM860 | Teledyne Crystalonics |
| 14a, 14b | 4176 | B & K Type |
| 44 | 420G | 100-0-100 μA Triplett |
| S1 | 4-Pole 9-Position Shorting | 10 dB Steps Central AB PA-2000 Series |
| S2, S3 | Toggle DPDT Switch | ALCO |
| S4 | 3-Position Rotary | Central AB PS-100 Series |
| R1 | 51 Ω | .25 W Carbon Film 5% |
| R2 | 21.6K | .125 Metal Film 1% Dale CMF-70° C. |
| R3 | 68.4K | .125 Metal Film 1% Dale CMF-70° C. |
| R4 | 216K | .125 Metal Film 1% Dale CMF-70° C. |
| R5 | 684K | .125 Metal Film 1% Dale CMF-70° C. |
| R6 | 21.6K | .125 Metal Film 1% Dale CMF-70° C. |
| R7 | 68.4K | .125 Metal Film 1% Dale CMF-70° C. |
| R8 | 216K | .125 Metal Film 1% Dale CMF-70° C. |
| R9 | 684K | .125 Metal Film 1% Dale CMF-70° C. |
| R10 | 100 Ω | .25 W Carbon Film 5% |
| R11 | 5K Variable | 20 Turn Trim Bourns 3006P |
| R11a | 7.5K | .125 W Metal Film 1% DALE CMF-60° C. |
| R12 | 10K | .125 W Metal Film 1% DALE CMF-60° C. |
| R13 | 510K | .125 W Metal Film 1% DALE CMF-60° C. |
| R14 | 1 M | .125 W Metal Film 1% DALE CMF-60° C. |
| R14a | 100 Ω | .25 W Carbon Film 5% |
| R15 | 360K | .125 W Metal Film 1% DALE CMF-60° C. |
| R16 | 4.3K | .125 W Metal Film 1% DALE CMF-60° C. |
| R17 | 560K | .125 W Metal Film 1% DALE CMF-60° C. |
| R18 | 24K | .125 W Metal Film 1% DALE CMF-60° C. |

TABLE-continued

| COMPONENT | VALUE | |
|---|---|---|
| R19 | 50K Variable | Bourns 3006P |
| R20 | 210K | 125 W Metal Film 1% DALE |
| R21 | 1 M Variable | Bourns 3006P |
| R22 | 1 M | .125 W Metal Film 1% DALE |
| R23 | 1 M Variable | Bourns 3006P |
| R24 | 1 M | .125 W Metal Film 1% DALE CMF-60° C. |
| R25 | 1 M | .125 W Metal Film 1% DALE CMF-60° C. |
| R26 | 1 M | .125 W Metal Film 1% DALE CMF-60° C. |
| R27 | 1 M | .125 W Metal Film 1% DALE CMF-60° C. |
| R28 | 1 M | .125 W Metal Film 1% DALE CMF-60° C. |
| R29 | 1 M | .125 W Metal Film 1% DALE CMF-60° C. |
| R30 | 1 M | .125 W Metal Film 1% DALE CMF-60° C. |
| R31 | 1 M | .25 W Carbon Film 5% |
| R32 | 1 M | .125 W Metal Film 1% DALE CMF-60° C. |
| R33 | 100K | .125 W Metal Film 1% DALE CMF-60° C. |
| R34 | 1 M | .125 W Metal Film 1% DALE CMF-60° C. |
| R35 | 10K | .25 W Carbon Film 5% |
| R36 | 100K Variable | Bourns 3006P |
| R37 | 1 M | .125 W Metal Film 1% DALE CMF-60° C. |
| R38 | 10K | .125 W Metal Film 1% DALE CMF-60° C. |
| R39 | 10K | .25 W Carbon Film 5% |
| R40 | 100K Variable | Bourns 3006P |
| R41 | 1 M | .125 W Metal Film 1% DALE CMF-60° C. |
| R42 | 10K | .125 W Metal Film 1% DALE |
| R43 | 5.1K | .125 W Metal Film 1% DALE |
| R44 | 39.2K | .125 W Metal Film 1% DALE |
| R45 | 10K | .125 W Metal Film 1% DALE |
| R46 | 200K | .125 W Metal Film 1% DALE |
| R47 | 100K Variable | Bourns 3006P |
| R48 | 10 Ω | .25 W Metal Film 1% DALE |
| R49 | 10K Variable | Bourns 3006P |
| R50 | 10 Ω | .25 W Metal Film 1% DALE |
| R51 | 10K Variable | Bourns 3006P |
| R52 | 10 Ω | .25 W Metal Film 1% DALE |
| R53 | 10K Variable | Bourns 3006P |
| R54 | 300K | .25 W Metal Film 1% DALE |
| R55 | 20K | .25 W Metal Film 1% DALE |
| R56 | 10 M | .25 W Metal Film 1% DALE |
| R57 | 10K | .25 W Metal Film 1% DALE |
| R58 | 10 M | .25 W Metal Film 1% DALE |
| R59 | 100 M | ELTEC TYPE 104 |
| R60 | 10 M | .25 W Metal Film 1% DALE |
| R61 | 2.2K | .25 W Metal Film 1% DALE |
| R62 | 9K | .25 W Metal Film 1% DALE |
| R63 | 9K | .25 W Metal Film 1% DALE |
| T1 | CABLE | |
| D1 | LED | Hewlett Packard #5082-4693 |
| D2 | LED | Hewlett Packard #5082-4693 |
| V1,V2, V3,V4 | 4 AA AKALINE | Duracell #MN1500 |
| Z1 | LM 336 BZ-2.5 | National Semiconductor |
| Z2 | LM 336 BZ 2.5 | National Semiconductor |

With reference to the circuit shown in FIGS. 2A, 2B, 2C, the first preamplifier stage 18a, 18b is included within the microphone 14a, 14b as previously shown. The purpose for including the first preamplifier stage 14a, 14b is for the ease in sending a low impedance versus a high impedance over cables, and so that the input signal can be sent over the cable because of loss of sensitivity without amplification. The function of the second preamplifier stage 20a, 20b is to provide gain from unity to 10,000 in 10 DB steps. Switch 51 on the device 10 changes the gain of the amplifier means on both channels simultaneously. R1 and C1 provide decoupled power for the second preamplifier stage 20a, 20b. C2 is a coupling capacitor and R14 is a bias resistor for the amp U1 as C5 and R13 perform like functions for U2. The time constant on C2 and R13, C5 and R14 were chosen to couple 50 hertz with no phase shift. With reference to U1, C3 and R10 and likewise C4 and R14A are power-supplied decoupling networks and function to keep the U1 and U2 from oscillating. R11a, R11 together with R2, R3, R4 and R5 comprises the parts of the summing junction which determine the gain of the amplifier U1 as is well known in the art. The gain from 1 to 10,000 is across both U1 and U2. For example, switching the main switch 51 one notch causes the circuit from R11a to one side of R2 in U1 to be switched to the other side of R2. In the case of U2, the first notch still maintains R12 in circuit with the first side of R6. The gain on U1 is then across the 21.6K R2 and the R11 and R11a which results in a 10 DB gain for U1 and U2 is held at unity. The gain is determined by the ratio, for example, of R2 to R11 and R11a. R11 is a 5K variable resistor which allows matching of the gains of the two microphones 14a, 14b. The A-switching means 66 consist of first and second A-weighted circuits 67a, 67b which comprise the elements shown in FIG. 2B. Two of the elements R21 and R19 are adjustable. R19 adjusts the A-weighted curve at approximately 1 kilohertz and R21 adjusts the curve at approximately 10 kilohertz to normalize the curve, that is to make it coincide with the A-weighting curve as closely as possible. The purpose of the U3 amplifier is to normalize the throughput gain at 1000 hertz to unity of the whole A-weighting network. R22 and R23 are feedback resistors used to adjust the gain of U3. C10 and C11 are decoupling capacitors to prevent oscillations. The A-weighted circuit functions only when switch S2 is thrown to the A-weighted position. Otherwise, it is in the linear mode. U9 normalizes the gain of the integrator at 50 hertz to unity. R25, R26, R24 of the summing means 22 and R28, R29 and R27 are all one megohm resistors manufactured by Dale Electronics and are precision resistors, metal film type 0.1 percent, 20 ppm. R58 in the first preamplifier stage 18a, 18b is manufactured by a speciality company, Eltec, and was selected for its physical size. V10 manufactured by Analog Devices, Model No. AD534 is an analog multiplier. C7 and R39; C6 and R35 have the same purpose as previously mentioned for R39 and C7. R36, R37, R38 are used to adjust input errors associated with the multiplier. Likewise R40, R41 and R42 are used for the same purpose. Inputs Y1 and Y2 on U8 are the X-inputs; inputs Y6 and Y7 on U8 are the Y-inputs. R43 is a resistor which in this case is set to approximately 5 and R44 and R45 are feedback resistors with the result being that multiplier U10 gives an output of X times Y at number Y12 output.

The error correction means 58 comprises U4, U11 and U7. U4 and U11 are analog switches configured to be double pole, double throw switches manufactured by Siliconix, Model No. DG201. U7 is an oscillator, for example, manufactured by RCA, Model No. CD4047B which is used to clock the switches U4 and U11. They reverse the polarity of the sound pressure signals from 14a, 14b and simultaneously reverse the polarity of the meter circuit thereby eliminating phase induced errors and also correcting, any DC component from the circuit to obviate problems with meter sensitivity.

The power supply means 48. includes U12 which is a low voltage indicator manufactured by Intersil, Model No. 8211. R58 and Z1 function as voltage references for the offset adjustments on the multiplier previously mentioned. Likewise R59 and Z2. Z1 and Z2 are elements manufactured by National Semiconductor, Model No. LM 336. D1 is a low battery indicator and D2 is a pilot lamp.

We claim:

1. A portable acoustic intensity measuring device comprising:
  (a) electroacoustic transducer means comprising a pair of electroacoustic transducers positioned at a predetermined distance from one another, a first of said electroacoustic transducers for producing a first electrical analog signal representative of the sound pressure at said first electroacoustic transducer and a second of said electroacoustic transducers for producing a second electrical analog signal representative of the sound pressure at said second electroacoustic transducer;
  (b) preamplifier means connected in circuit with said electroacoustic transducer means for amplifying said first and second electrical analog signals by a predetermined gain, said preamplifier means having output means, said preamplifier means for producing first and second preamplified sound pressure analog signals at said preamplifier means output means;
  (c) analog summing means connected in circuit with said preamplifier output means, said summing means comprises first and second input means for receiving said first and second preamplified sound pressure analog signals, said summing means having output means, said summing means for producing at said summing output a summed analog output signal representative of the average of the sum of said first and second preamplified sound pressure analog signals;
  (d) analog subtraction means connected in circuit with said preamplifier output means, said analog subtraction means comprises first and second input means for receiving said first and second preamplified sound pressure analog signals, said analog subtraction means having output means, said analog subtraction means for producing at said subtraction means output a difference analog output signal representative of the difference of said first and second preamplified sound pressure analog signals;
  (e) analog integrator means having input means connected in circuit with said subtraction output means, said analog integrator means having output means, said analog integrator means for producing at said analog integrator output means an integrated analog signal representative of the particle velocity midway between said electroacoustic transducers;
  (f) analog multiplier means having first and second input means, said first multiplier input means connected in circuit with said summing output means, said second multiplier input means connected in circuit with said integrator output means, said analog multiplier means having output means, said analog multiplier for multiplying said summed output signal together with said integrated output signal, and producing an acoustic intensity signal at said multiplier output representative of an acoustic intensity vector midway between said electroacoustic transducers;
  (g) meter means connected in circuit with said multiplier output means for receiving said acoustic intensity signal, said meter means including visual display means responsive to said acoustic intensity signal for visually indicating said acoustic intensity vector;
  (h) power supply means for supplying power for said acoustic intensity device;
  (i) error correction means connected in circuit with said preamplifier means and said meter means, said error correction means including switching means comprising a first switching means connected in circuit with said preamplifier means and said summing means and said subtraction means and a second switch means connected in circuit with said multiplier means and said meter means for simultaneously switching said first and second preamplified analog signals at said summing input means and said subtraction input means and for simultaneously switching the polarity of said acoustic intensity signal at said meter means.

2. The portable acoustic intensity device of claim 1, wherein said error correction means further comprises oscillator means in circuit with said first and second switching means.

* * * * *